(12) United States Patent
Akl et al.

(10) Patent No.: US 11,432,224 B2
(45) Date of Patent: Aug. 30, 2022

(54) POWER SUPPLY CATEGORY AND POWER STATUS REPORTING IN A WIRELESS MULTI-HOP NETWORK

(71) Applicant: QUALCOMM Incorporated, San Diego, CA (US)

(72) Inventors: Naeem Akl, Somerville, NJ (US); Navid Abedini, Somerset, NJ (US); Junyi Li, Chester, NJ (US); Jianghong Luo, Skillman, NJ (US); Luca Blessent, Whitehouse Station, NJ (US); Karl Georg Hampel, Hoboken, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/836,014

(22) Filed: Mar. 31, 2020

(65) Prior Publication Data

US 2020/0367134 A1 Nov. 19, 2020

Related U.S. Application Data

(60) Provisional application No. 62/848,126, filed on May 15, 2019.

(51) Int. Cl.
*H04W 40/10* (2009.01)
*H04W 40/24* (2009.01)
(Continued)

(52) U.S. Cl.
CPC .......... *H04W 40/10* (2013.01); *G06F 1/3209* (2013.01); *H04W 40/244* (2013.01); *H04W 40/246* (2013.01); *H04W 40/28* (2013.01)

(58) Field of Classification Search
CPC ... G06F 1/3209; H04W 40/10; H04W 40/244; H04W 40/246; H04W 40/28; H04W 52/0277; Y02D 30/70
See application file for complete search history.

(56) References Cited

U.S. PATENT DOCUMENTS 6,025,695 A * 2/2000 Friel .................. H02J 7/00036
320/106
2003/0190938 A1 10/2003 Ganton
(Continued)

FOREIGN PATENT DOCUMENTS

EP 2446696 A1 5/2012

OTHER PUBLICATIONS

International Search Report and Written Opinion—PCT/US2020/026132—ISA/EPO—dated Jul. 27, 2020.

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a node in a wireless multi-hop network may identify a power supply category of the node based at least in part on a manner in which the node is supplied with power, wherein the power supply category indicates whether the node is supplied with power from an alternating current power supply or a battery power supply. The node may transmit a power status report to another node in the wireless multi-hop network, wherein the power status report indicates the power supply category of the node. Numerous other aspects are provided.

30 Claims, 7 Drawing Sheets

(51) Int. Cl.
   *G06F 1/3209*   (2019.01)
   *H04W 40/28*   (2009.01)

(56) References Cited

U.S. PATENT DOCUMENTS

| | | | |
|---|---|---|---|
| 2005/0125705 A1* | 6/2005 | Cheng | G06F 1/3203 |
| | | | 713/322 |
| 2007/0201381 A1 | 8/2007 | Ekl et al. | |
| 2008/0075028 A1* | 3/2008 | Park | H04L 45/122 |
| | | | 370/311 |
| 2011/0004778 A1* | 1/2011 | Tsukamoto | G06F 1/3278 |
| | | | 713/324 |

* cited by examiner

POWER SUPPLY CATEGORY AND POWER STATUS REPORTING IN A WIRELESS MULTI-HOP NETWORK

CROSS-REFERENCE TO RELATED APPLICATION

This Patent Application claims priority to U.S. Provisional Patent Application No. 62/848,126, filed on May 15, 2019, entitled "POWER SUPPLY CATEGORY AND POWER STATUS REPORTING IN A WIRELESS MULTI-HOP NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power supply category and power status reporting in a wireless multi-hop network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node in a wireless multi-hop network, may include identifying a power supply category of the node based at least in part on a manner in which the node is supplied with power, wherein the power supply category indicates whether the node is supplied with power from an alternating current power supply or a battery power supply; and transmitting a power status report to another node in the wireless multi-hop network, wherein the power status report indicates the power supply category of the node. In some aspects, the power status report further indicates at least one of: a remaining level of battery power of the node, whether a battery of the node is being charged, a degree to which the battery of the node is being charged, an estimated remaining operating time of the node, or a combination thereof.

In some aspects, a method of wireless communication, performed by a first node in a wireless multi-hop network, may include receiving, from a second node in the wireless multi-hop network, a power status report that indicates a power supply category of the second node, wherein the power supply category indicates whether the second node is supplied with power from an alternating current power supply or a battery power supply; and transmitting an instruction to one or more nodes in the wireless multi-hop network based at least in part on the power status report. In some aspects, the power status report further indicates at least one of: a remaining level of battery power of the node, whether a battery of the node is being charged, a degree to which the battery of the node is being charged, an estimated remaining operating time of the node, or a combination thereof.

In some aspects, a node for wireless communication in a wireless multi-hop network may include memory and one or more processors operatively coupled to the memory. The memory and the one or more processors may be configured to identify a power supply category of the node based at least in part on a manner in which the node is supplied with power, wherein the power supply category indicates whether the node is supplied with power from an alternating current power supply or a battery power supply; and transmit a power status report to another node in the wireless multi-hop network, wherein the power status report indicates the power supply category of the node. In some aspects, the power status report further indicates at least one of: a remaining level of battery power of the node, whether a battery of the node is being charged, a degree to which the battery of the node is being charged, an estimated remaining operating time of the node, or a combination thereof.

In some aspects, a first node for wireless communication in a wireless multi-hop network may include memory and one or more processors operatively coupled to the memory. The memory and the one or more processors may be configured to receive, from a second node in the wireless multi-hop network, a power status report that indicates a power supply category of the second node, wherein the power supply category indicates whether the second node is supplied with power from an alternating current power supply or a battery power supply; and transmit an instruction to one or more nodes in the wireless multi-hop network based at least in part on the power status report. In some aspects, the power status report further indicates at least one of: a remaining level of battery power of the node, whether a battery of the node is being charged, a degree to which the battery of the node is being charged, an estimated remaining operating time of the node, or a combination thereof.

In some aspects, a non-transitory computer-readable medium may store one or more instructions for wireless communication. The one or more instructions, when executed by one or more processors of a node in a wireless multi-hop network, may cause the one or more processors to: identify a power supply category of the node based at least in part on a manner in which the node is supplied with power, wherein the power supply category indicates whether the node is supplied with power from an alternating current power supply or a battery power supply; and transmit a power status report to another node in the wireless multi-hop network, wherein the power status report indicates the power supply category of the node. In some aspects, the power status report further indicates at least one of: a remaining level of battery power of the node, whether a battery of the node is being charged, a degree to which the battery of the node is being charged, an estimated remaining operating time of the node, or a combination thereof.

In some aspects, a non-transitory computer-readable medium may store one or more instructions for wireless communication. The one or more instructions, when executed by one or more processors of a first node in a wireless multi-hop network, may cause the one or more processors to: receive, from a second node in the wireless multi-hop network, a power status report that indicates a power supply category of the second node, wherein the power supply category indicates whether the second node is supplied with power from an alternating current power supply or a battery power supply; and transmit an instruction to one or more nodes in the wireless multi-hop network based at least in part on the power status report. In some aspects, the power status report further indicates at least one of: a remaining level of battery power of the node, whether a battery of the node is being charged, a degree to which the battery of the node is being charged, an estimated remaining operating time of the node, or a combination thereof.

In some aspects, a node for wireless communication in a wireless multi-hop network may include means for identifying a power supply category of the node based at least in part on a manner in which the node is supplied with power, wherein the power supply category indicates whether the node is supplied with power from an alternating current power supply or a battery power supply; and means for transmitting a power status report to another node in the wireless multi-hop network, wherein the power status report indicates the power supply category of the node. In some aspects, the power status report further indicates at least one of: a remaining level of battery power of the node, whether a battery of the node is being charged, a degree to which the battery of the node is being charged, an estimated remaining operating time of the node, or a combination thereof.

In some aspects, a first node for wireless communication in a wireless multi-hop network may include means for receiving, from a second node in the wireless multi-hop network, a power status report that indicates a power supply category of the second node, wherein the power supply category indicates whether the second node is supplied with power from an alternating current power supply or a battery power supply; and means for transmitting an instruction to one or more nodes in the wireless multi-hop network based at least in part on the power status report. In some aspects, the power status report further indicates at least one of: a remaining level of battery power of the node, whether a battery of the node is being charged, a degree to which the battery of the node is being charged, an estimated remaining operating time of the node, or a combination thereof.

Aspects generally include a method, apparatus, system, computer program product, non-transitory computer-readable medium, user equipment, base station, wireless communication device, node, integrated access and backhaul (IAB) node, IAB donor, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
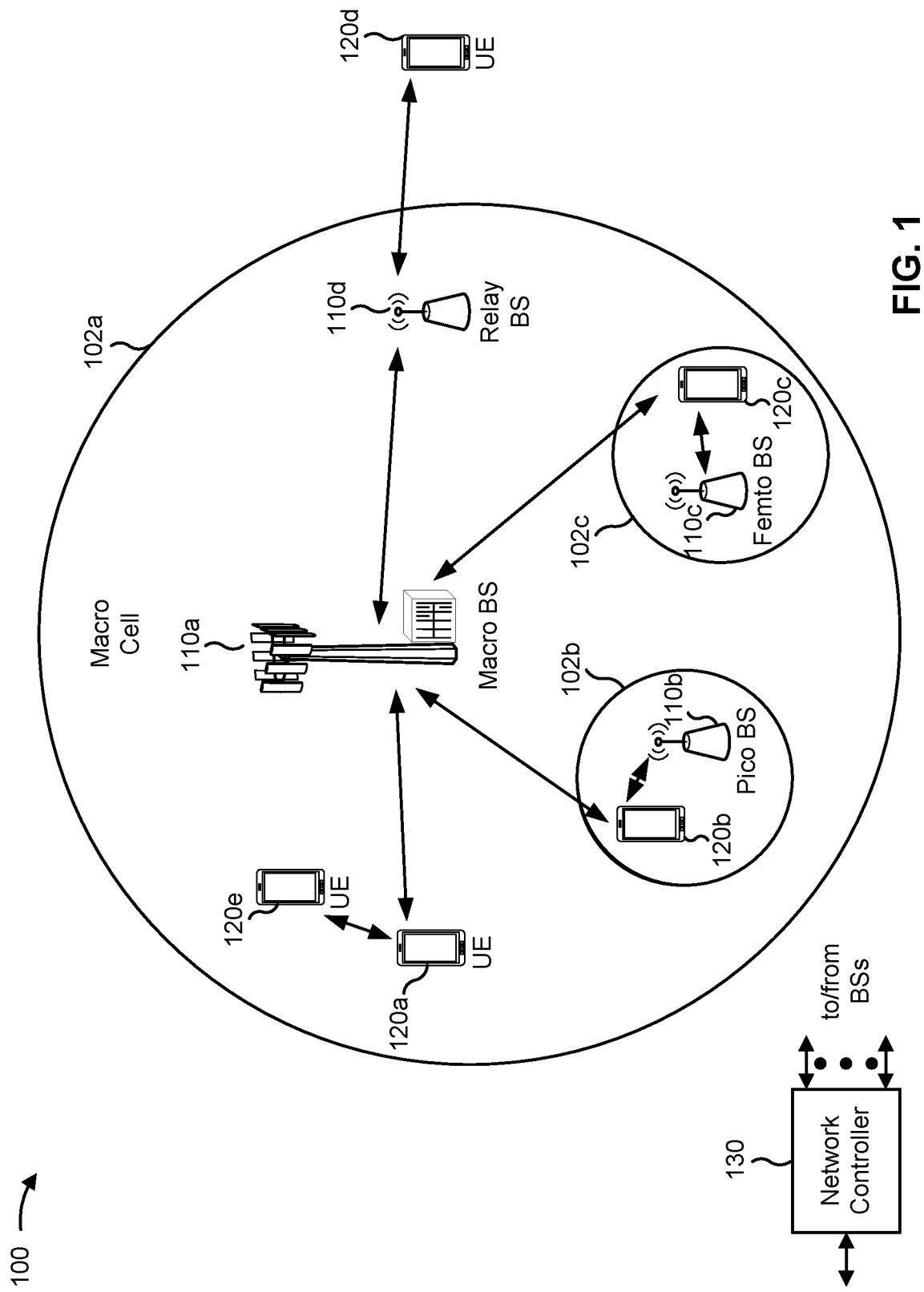
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
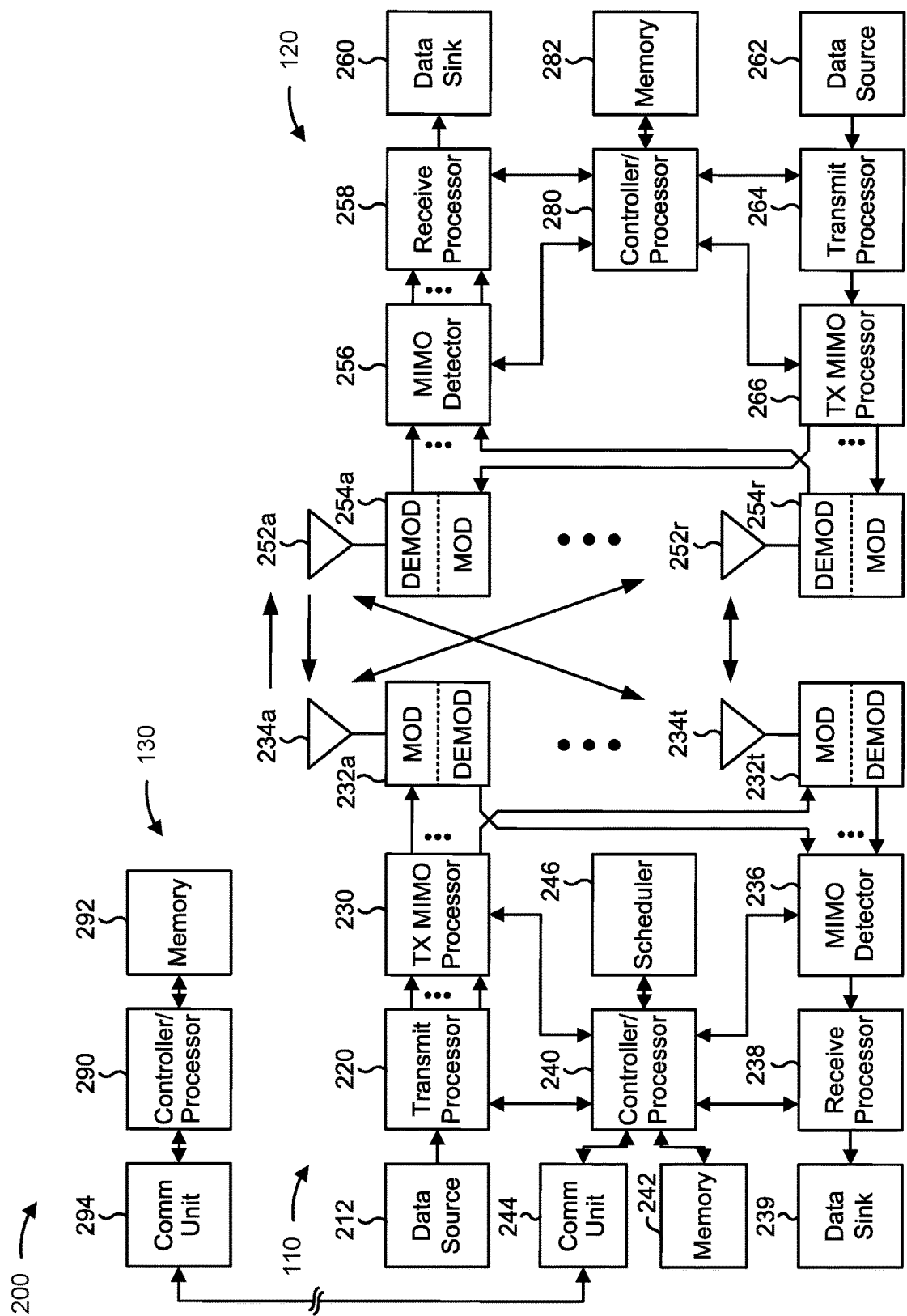
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power supply category and power status reporting in a wireless multi-hop network, as described in more detail elsewhere herein. Additionally, or alternatively, a node in an integrated access and backhaul (IAB) network (e.g., an IAB node, an IAB donor, and/or the like) and/or a node in another type of wireless multi-hop network may perform one or more techniques associated with power supply category and power status reporting. As described in more detail elsewhere herein, such a node may include a mobile termination or a mobile terminal (MT) component and a distributed unit (DU) component. Additionally, or alternatively, a node (e.g., an IAB donor) may include a central unit (CU) component and a DU component. The MT component may perform one or more functions of a UE 120 described herein (e.g., in connection with FIGS. 1-3) and/or may include one or more components of a UE 120 described herein (e.g., in connection with FIG. 2). The DU component may perform one or more functions of a base station 110 described herein (e.g., in connection with FIGS. 1-3), such as scheduling, and/or may include one or more components of a base station 110 described herein (e.g., in connection with FIG. 2). The CU component may perform one or more functions of a base station 110 described herein (e.g., in connection with FIGS. 1-3), such as configuration for other nodes, and/or may include one or more components of a base station 110 described herein (e.g., in connection with FIG. 2).

Figure 6:
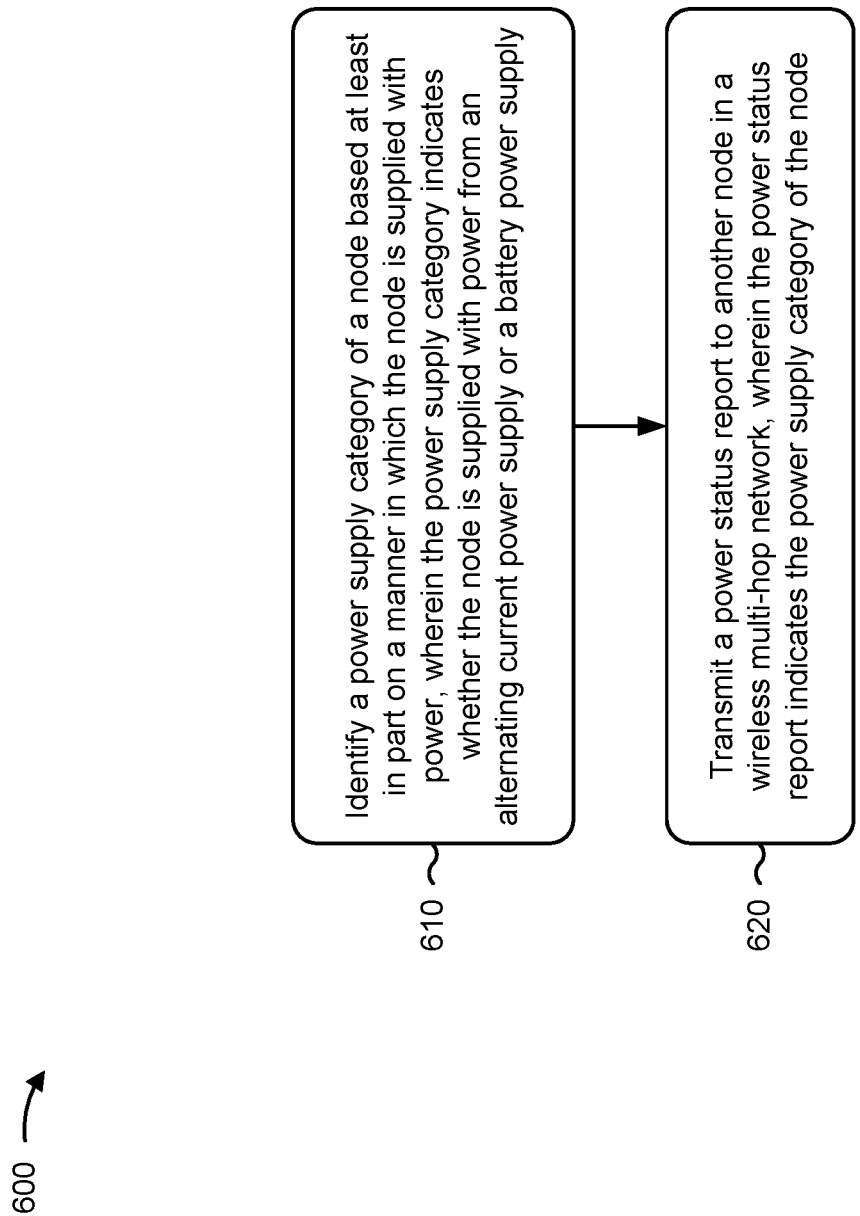
FIGS. 6 and 7 are diagrams illustrating example processes relating to power supply category and power status reporting
Figure 7:
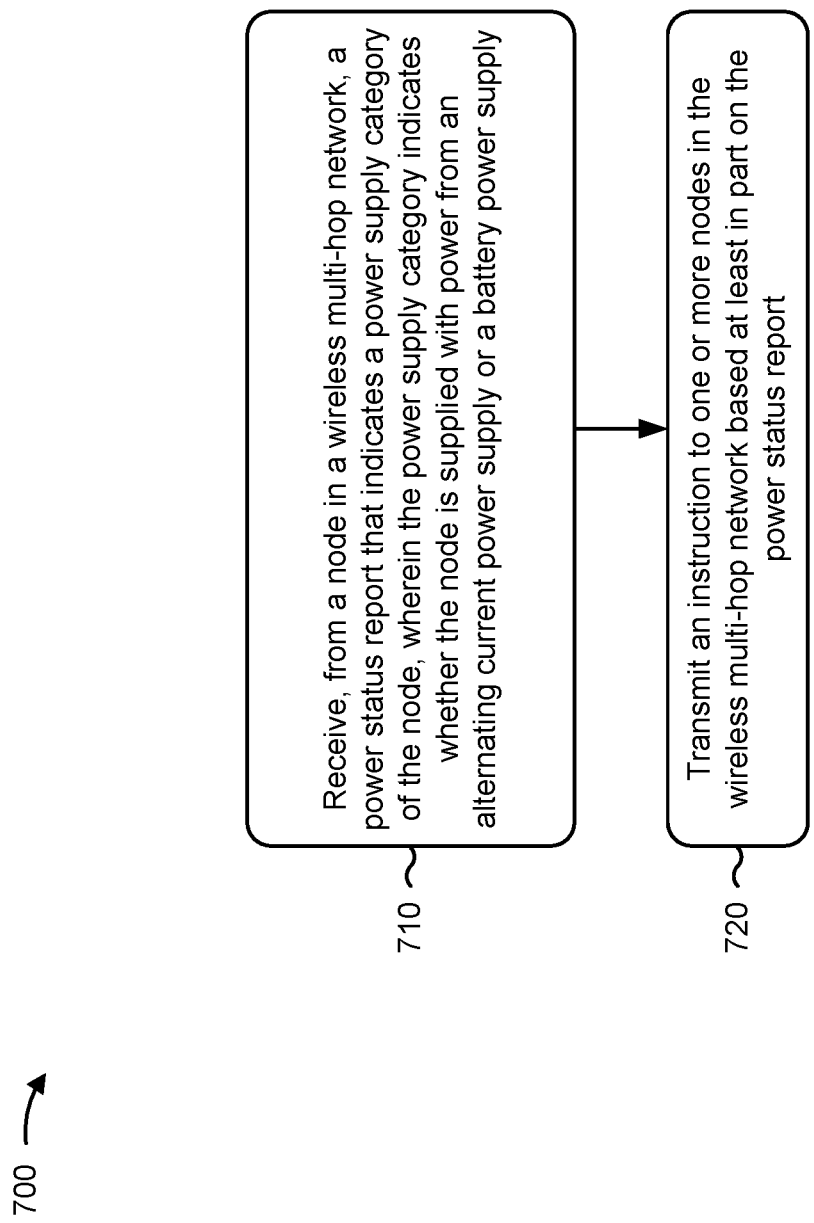

In some aspects, controller/processor 240 of base station 110 and/or a node, controller/processor 280 of UE 120 and/or a node, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, a node in a multi-hop network (e.g., as described elsewhere herein) may include means for identifying a power supply category of the node based at least in part on a manner in which the node is supplied with power, wherein the power supply category indicates whether the node is supplied with power from an alternating current power supply or a battery power supply; means for transmitting a power status report to another node in the wireless multi-hop network, wherein the power status report indicates the power supply category of the node; and/or the like. In some aspects, such means may include one or more components of UE 120 and/or base station 110 (which may be included in the node) described in connection with FIG. 2.

In some aspects, a first node in a wireless multi-hop network (e.g., as described elsewhere herein) may include means for receiving, from a second node in the wireless multi-hop network, a power status report that indicates a power supply category of the second node, wherein the power supply category indicates whether the second node is supplied with power from an alternating current power supply or a battery power supply; means for transmitting an instruction to one or more nodes in the wireless multi-hop network based at least in part on the power status report; and/or the like. In some aspects, such means may include one or more components of UE 120 and/or base station 110 (which may be included in the node) described in connection with FIG. 2.

As indicated above, FIG. 2 is provided as an example. Other examples may differ from what is described with regard to FIG. 2.

Figure 3:
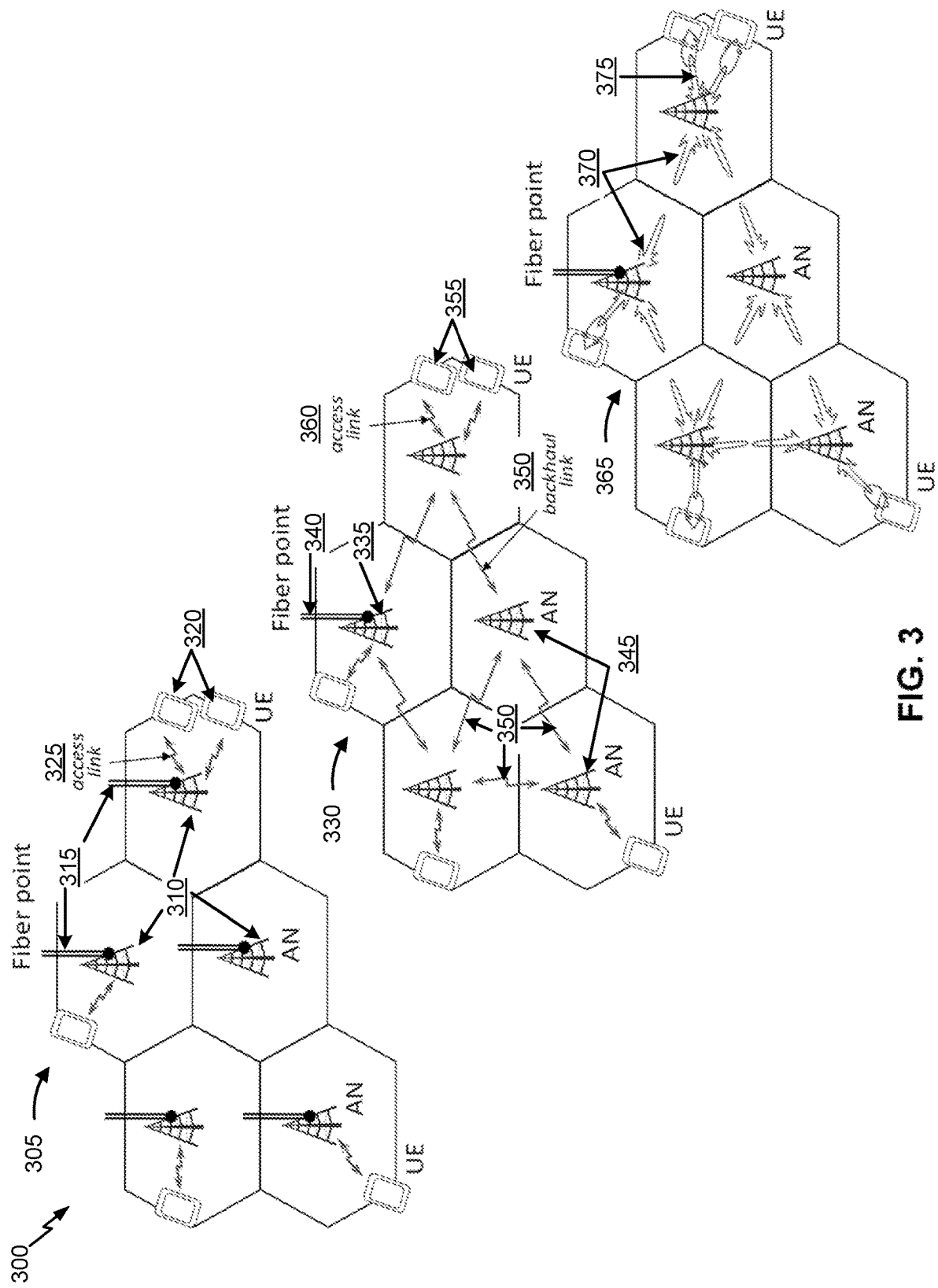
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
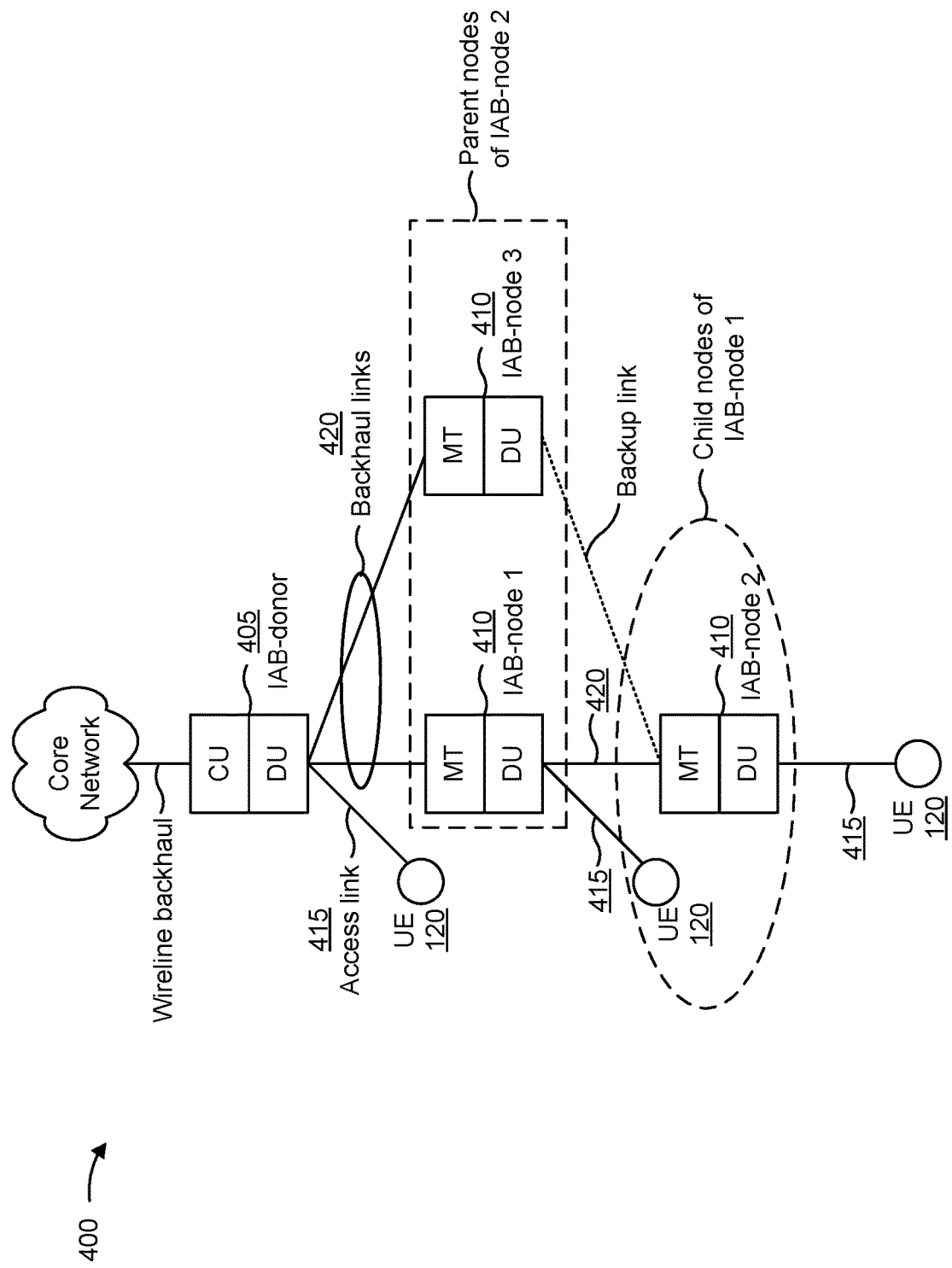
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (FLAP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

In an IAB network, network resources for wireless communications (e.g., time resources, frequency resources, spatial resources, and/or the like) may be shared between access links 415 and backhaul links 420. Due to the multi-hop architecture of an IAB network, IAB nodes 410 that are closer to the IAB donor 405 (e.g., that are fewer hops from the IAB donor 405) may experience a higher traffic load than IAB nodes 410 that are farther from the IAB donor 405 (e.g., that are more hops from the IAB donor 405) because IAB nodes 410 closer to the IAB donor 405 need to receive, process, and/or transmit traffic received from nodes located farther from the IAB donor 405.

In order to ensure reliable network operation, an IAB network may be over-deployed with a high density of nodes to permit multiple routes to an IAB donor 405 (e.g., via a primary backhaul link and one or more backup backhaul links). To assist with such over-deployment, some IAB nodes 410 may be deployed in an area where alternating current (AC) power is not available and/or where it is difficult to supply the IAB node 410 with AC power. Thus, some IAB nodes 410 may be supplied with power from a more reliable source, such as AC power (e.g., non-battery power), and some IAB nodes 410 may be supplied with power from a less reliable source, such as battery power (e.g., non-AC power, solar power, wind power, water power, renewable power, and/or the like). Furthermore, this may reduce power consumption and/or assist with the use of renewable power resources.

In a typical wireless network (e.g., a non-IAB network), access nodes (e.g., base stations 110) are supplied with AC power. The use of both AC-powered IAB nodes 410 and battery-powered IAB nodes 410 introduces complexities into the operation of an IAB network. For example, different IAB nodes 410 may need to be configured differently, may need to route traffic differently, may be capable of handling different traffic loads, and/or the like based at least in part on whether the IAB node 410 is AC-powered or battery-powered, a power status associated with a battery-powered IAB node 410, and/or the like. Some techniques and apparatuses described herein assist with reporting a power supply category and/or other power status information in a multi-hop network, such as an IAB network, so that IAB nodes 410 having different power supply categories and/or different power statuses can be appropriately configured.

As indicated above, FIG. 4 is provided as an example. Other examples may differ from what is described with regard to FIG. 4.

Figure 5:
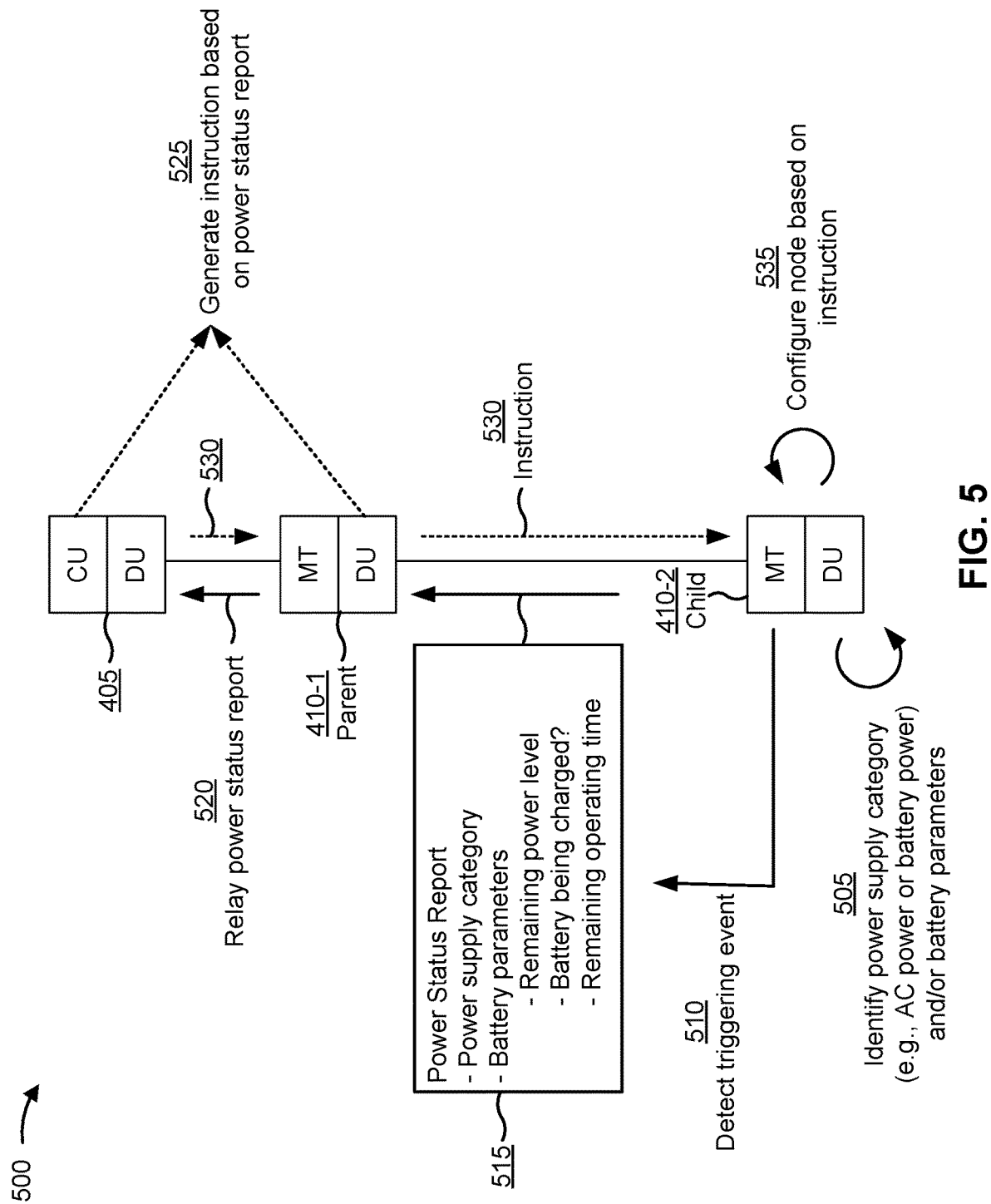
FIG. 5 is a diagram illustrating an example of power supply category and power status reporting in a wireless multi-hop network, in accordance with various aspects of the present disclosure.

FIG. 5 is a diagram illustrating an example of power supply category and power status reporting in a wireless multi-hop network, in accordance with various aspects of the present disclosure. As shown in FIG. 5, an IAB network may include an IAB donor 405 and one or more IAB nodes 410, shown as a first IAB node 410-1 that is parent node of a second IAB node 410-2 that is a child node of the first IAB node 410-1.

As shown by reference number 505, an IAB node 410 (e.g., the second IAB node 410-2) may identify a power supply category of the IAB node 410 based at least in part on a manner in which the node is supplied with power. The power supply category may indicate, for example, whether the node is supplied with power from an alternating current (AC) power supply or a battery power supply. In some aspects, the AC power supply may be a power supply external to the IAB node 410 (e.g., from a power plant), whereas the battery power supply may be a power supply internal to the IAB node 410 (e.g., a battery, a rechargeable battery, and/or the like). In some aspects, the battery power supply may be rechargeable, such as via solar power, wind power, water power, by plugging in the battery power supply to an AC power source, and/or the like. Additionally, or alternatively, the power supply category may indicate whether the node is supplied with power from a more reliable power source (e.g., an AC power supply) or a less reliable power source (e.g., a battery power supply).

In some aspects, the IAB node 410 may determine one or more battery parameters associated with the IAB node 410. For example, the IAB node 410 may determine one or more battery parameters based at least in part on a determination that the IAB node 410 is supplied with power from a battery power supply. In some aspects, if the IAB node 410 is supplied with power from an AC power supply, then the IAB node 410 may not determine the battery parameter(s).

In some aspects, a battery parameter may include a remaining level of battery power of the IAB node 410, which may represent a remaining charge of a battery of the IAB node 410. The remaining level of battery power may be indicated with a fine granularity (e.g., from 0% to 100% in increments of 1%) or with a coarse granularity (e.g., high, medium, or low).

Additionally, or alternatively, a battery parameter may indicate whether a battery of the IAB node 410 is being charged. For example, the IAB node 410 may determine a first value (e.g., 0 or NO) when the battery of the IAB node 410 is not currently being charged (e.g., at a time of the determination), and may determine a second value (e.g., 1 or YES) when the battery of the IAB node 410 is being charged. Additionally, or alternatively, a battery parameter may indicate a degree to which the battery of the IAB node 410 is being charged (e.g., slowly or quickly). For example, if the battery if the IAB node 410 is rechargeable using solar energy, the battery may charge quickly in direct sunlight and may charge slowly in indirect sunlight.

Additionally, or alternatively, a battery parameter may indicate an estimated remaining operating time of the IAB node 410. The IAB node 410 may determine an estimated remaining operating time based at least in part on the remaining level of battery power of the IAB node 410, a cell load of the IAB node 410 (e.g., an amount of network traffic being received, processed, and/or transmitted by the IAB node 410), an estimated future cell load of the IAB node 410 (e.g., which may be determined based at least in part on historical cell load data), an environmental factor associated with the node, and/or the like. The environmental factor may include a current environmental factor (e.g., an amount of sun exposure, an amount of wind exposure, an amount of hydropower exposure, an external temperature, an internal temperature, a humidity level, and/or the like) and/or a predicted future environmental factor, such as a predicted amount of sun exposure and/or the like (e.g., based at least in part on a weather report, historical data, and/or the like).

As shown by reference number 510, in some aspects, the IAB node 410 may detect a triggering event that causes the IAB node 410 to transmit a power status report to another node in the IAB network (e.g., a parent node, a child node, an IAB donor 405, a CU of the IAB donor 405, and/or the like). In some aspects, the IAB node 410 may be configured (e.g., by a CU of the IAB donor 405) to periodically transmit a power status report. In this case, the IAB node 410 may transmit the power status report periodically according to a reporting periodicity indicated in the configuration. Additionally, or alternatively, the IAB node 410 may transmit the power status report aperiodically, such as based at least in part on detecting a triggering event other than that associated with periodic transmission.

In some aspects, the triggering event may include a determination that the IAB node 410 has joined the IAB network. For example, when an IAB node 410 establishes a network connection with another IAB node 410 (e.g., using a random access channel (RACH) procedure and/or the like), the IAB node 410 may transmit the power status report (e.g., as part of a capability exchange, a radio resource control (RRC) configuration procedure, and/or the like).

Additionally, or alternatively, the triggering event may include a determination that the power supply category has changed. For example, the IAB node 410 may determine that the power supply category has changed from AC power to battery power (or vice versa), and may transmit the power status report based at least in part on determining that the power supply category has changed. Additionally, or alternatively, the triggering event may include a determination that a charge state of a battery of the IAB node 410 has changed. The charge state may indicate whether the battery of the IAB 410 node is being charged. Thus, the IAB node 410 may determine that the charge state has changed from being charged to not being charged (or vice versa), and may transmit the power status report based at least in part on determining that the charge state has changed. Additionally, or alternatively, if the charge state changes in degree from, for example, charging slowly to charging quickly, then the IAB node 410 may transmit the power status report.

Additionally, or alternatively, the triggering event may include a determination that a remaining level of battery power of the IAB node 410, a degree to which the battery of the IAB node 410 is being charged, and/or an estimated remaining operating time of the IAB node 410 satisfies a condition. For example, if the remaining level of battery power falls below or surpasses a threshold, if the degree to which the battery of the IAB node 410 is being charged (e.g., a charge speed) falls below or surpasses a threshold, and/or if the estimated remaining operating time of the IAB node 410 falls below or surpasses a threshold, then the IAB node 410 may transmit the power status report.

Additionally, or alternatively, the triggering event may include a request for the power status report received from another IAB node 410 (e.g., a parent node, a CU of an IAB donor 405, and/or the like). For example, the first IAB node 410-1 and/or the IAB donor 405 may transmit a request for the second IAB node 410-2 to transmit the power status report. The second IAB node 410-2 may receive the request, and may transmit the power status report based at least in part on receiving the request.

As shown by reference number 515, the IAB node 410 may transmit the power status report to another node in the IAB network. In example 500, the other node is shown as a parent node. However, the IAB node 410 may additionally or alternatively transmit the power status report to a child node (e.g., to instruct the child node to obtain a new route), an IAB donor 405, and/or the like. For example, the IAB node 410 may transmit the power status report via a Uu interface (e.g., between IAB nodes 410), via an F1-AP interface (e.g., between an IAB node 410 and a CU), and/or the like.

As shown, the power status report may indicate the power supply category of the IAB node 410 (e.g., AC power or battery power). Accordingly, the power status report may be referred to as a power supply category report in some cases. Additionally, or alternatively, the power status report may indicate one or more battery parameters. In some aspects, the IAB node 410 may transmit the one or more battery parameters in the power status report when the IAB node 410 is supplied with battery power (e.g., and not with AC power). For example, the power status report may indicate a remaining level of battery power of the IAB node 410, whether a battery of the IAB node 410 is being charged, a degree to which the battery of the IAB node 410 is being charged, an estimated remaining operating time of the IAB node 410, and/or the like, as described above.

As shown by reference number 520, in some aspects, an IAB node 410 that receives the power status report (shown as the first IAB node 410-1) may relay the power status report to another node in the IAB network, shown as an IAB donor 405 (but which may include another node, such as a parent node of the first IAB node 410-1 or a child node of the first IAB node 410-1).

As shown by reference number 525, a node that receives the power status report (e.g., an IAB donor 405, a parent IAB node 410-1, and/or the like) may generate an instruction based at least in part on the power status report. The instruction may be an instruction for the IAB node 410 that generated the power status report and/or may be an instruction for one or more other IAB nodes 410 in the IAB network (e.g., one or more nodes in a route that includes the IAB node 410 that generated the power status report). In some aspects, the instruction may be different depending on whether the IAB node 410 is in a higher reliability power mode or a lower reliability power mode. The higher reliability power mode may include using an AC power supply as compared to a lower reliability power mode using a battery power supply, may include having a remaining level of battery power that satisfies a threshold as compared to a lower reliability power mode where the level does not satisfy the threshold, may include a charge state where the battery is being charged as compared to a lower reliability power mode where the battery is not being charged, may include a charge state where the battery is being charged more quickly as compared to a lower reliability power mode where the battery is being charged more slowly, may include having an estimated remaining operating time that satisfies a threshold as compared to a lower reliability power mode where the estimated remaining operating time does not satisfy the threshold, and/or the like.

In some aspects, the instruction may indicate a transmit power to be used by the IAB node 410 that generated the power status report. For example, the instruction may indicate a higher transmit power for an IAB node 410 having a higher reliability power mode, and may indicate a lower transmit power for an IAB node 410 having a lower reliability power mode. In this way, battery life may be extended for IAB nodes 410 operating on battery power and/or in a low reliability power mode.

Additionally, or alternatively, the instruction may indicate a resource configuration to be used by the IAB node 410 for a transmit occasion, a receive occasion, and/or the like. For example, the instruction may indicate a larger number of resources (e.g., a denser resource configuration, more resource blocks, and/or the like) for an IAB node 410 having a higher reliability power mode, and may indicate a smaller number of resources (e.g., a sparser resource configuration, fewer resource blocks, and/or the like) for an IAB node 410 having a lower reliability power mode. In this way, battery life may be extended for IAB nodes 410 operating on battery power and/or in a low reliability power mode.

Additionally, or alternatively, the instruction may indicate a duty cycle to be used by the IAB node 410. A duty cycle may indicate a duration of a transmission per transmission occasion. For example, the instruction may indicate a longer duty cycle (e.g., a longer transmission duration) for an IAB node 410 having a higher reliability power mode, and may indicate a smaller duty cycle (e.g., a shorter transmission duration) for an IAB node 410 having a lower reliability power mode. In this way, battery life may be extended for IAB nodes 410 operating on battery power and/or in a low reliability power mode.

Additionally, or alternatively, the instruction may indicate a beam sweeping configuration to be used by the IAB node 410. For example, the instruction may indicate to use more beams for beam sweeping (and/or narrower beams) for an IAB node 410 having a higher reliability power mode, and may indicate to use fewer beams for beam sweeping (and/or wider beams) for an IAB node 410 having a lower reliability power mode. In this way, battery life may be extended for IAB nodes 410 operating on battery power and/or in a low reliability power mode.

Additionally, or alternatively, the instruction may indicate a handover of UEs 120 and/or child nodes of the IAB node 410 to a different IAB node 410. For example, UEs 120 of an IAB node 410 in a lower reliability power mode may be handed over to UEs 120 of an IAB node 410 in a higher reliability power mode. In some aspects, a CU of an IAB donor 405 may cause the handover to be performed in order to balance traffic across IAB nodes 410, based at least in part on available power to those IAB nodes 410 (e.g., where nodes with higher power and/or in a higher reliability power mode have more traffic load than nodes with lower power and/or in a lower reliability power mode). In this way, a load on a lower reliability IAB node 410 may be reduced (e.g., thereby extending battery life), and service continuity and reliability may be enhanced.

Additionally, or alternatively, the instruction may indicate a reconfiguration of a route through the IAB network. For example, one or more routes may be reconfigured to bypass an IAB node 410 in a lower reliability power mode. In this way, a load on the lower reliability IAB node 410 may be reduced (e.g., thereby extending battery life), and service continuity and reliability may be enhanced. In some aspects, the route may be reconfigured by deactivating one or more backhaul links (e.g., a primary link) and activating one or more other backhaul links (e.g., a backup link). In some aspects, a CU of an IAB donor 405 may reconfigure a network topology (e.g., one or more routes) such that IAB nodes 410 in a higher reliability power mode are fewer hops from the IAB donor 405, and IAB nodes 410 in a lower reliability power mode are more hops from the IAB donor 405. With this configuration, higher reliability IAB nodes 410 will generally handle more network traffic than lower reliability IAB nodes 410, as described above in connection with FIG. 4.

In some aspects, the instruction may include a request for the IAB node 410 to shut down. For example, when the IAB node 410 has a low battery power (e.g., below a threshold) and/or a low remaining operating time (e.g., below a threshold), then the IAB node 410 may be instructed to shut down. Additionally, or alternatively, the IAB node 410 may initiate the shutdown based at least in part on determining that a battery parameter satisfies a condition (e.g., a battery parameter has fallen below a threshold). In this case, the IAB node 410 may transmit an indication, to another node in the IAB network (e.g., another IAB node 410 and/or a CU of an IAB donor 405), that the IAB node is shutting down. When such an indication is received and/or the IAB node 410 is instructed to shut down, the other node may transmit an instruction to hand over UEs 120 from the IAB node 410 that is to be shut down, to reconfigure one or more routes that include the IAB node 410 that is to be shut down, and/or the like. In this way, service continuity and reliability can be enhanced.

As shown by reference number 530, the IAB node 410 that generated the power status report may receive the instruction. For example, the IAB node 410 may receive the instruction from another IAB node 410 (e.g., a parent node) and/or an IAB donor 405. In some aspects, IAB node 410 may receive the instruction via a Uu interface (e.g., between IAB nodes 410), via an F1-AP interface (e.g., between an IAB node 410 and a CU), and/or the like.

As shown by reference number 535, the IAB node 410 that generated the power status report may configure itself based at least in part on the instruction. For example, the IAB node 410 may configure a transmit power, a resource configuration, a duty cycle, a beam sweeping configuration, a handover, a route, and/or the like based at least in part on the instruction. Additionally, or alternatively, the IAB node 410 may shut down based at least in part on the instruction. In this way, a battery life of the IAB node 410 may be extended, service continuity may be enhanced, reliability may be improved, latency may be reduced, and/or the like.

As indicated above, FIG. 5 is provided as an example. Other examples may differ from what is described with respect to FIG. 5.

FIG. 6 is a diagram illustrating an example process 600 performed, for example, by a node in a wireless multi-hop network (e.g., an IAB network), in accordance with various aspects of the present disclosure. Example process 600 is an example where a node (e.g., IAB node 410 and/or the like) performs operations associated with power supply category and power status reporting in a wireless multi-hop network.

As shown in FIG. 6, in some aspects, process 600 may include identifying a power supply category of the node based at least in part on a manner in which the node is supplied with power, wherein the power supply category indicates whether the node is supplied with power from an alternating current power supply or a battery power supply (block 610). For example, the node (e.g., using controller/processor 240, controller/processor 280, memory 242, memory 282, and/or the like) may identify a power supply category of the node based at least in part on a manner in which the node is supplied with power, as described above. In some aspects, the power supply category indicates whether the node is supplied with power from an alternating current power supply or a battery power supply.

As further shown in FIG. 6, in some aspects, process 600 may include transmitting a power status report to another node in the wireless multi-hop network, wherein the power status report indicates the power supply category of the node (block 620). For example, the node (e.g., using transmit processor 220, transmit processor 264, controller/processor 240, controller/processor 280, memory 242, memory 282, and/or the like) may transmit a power status report to another node in the wireless multi-hop network, as described above. In some aspects, the power status report indicates the power supply category of the node.

Process 600 may include additional aspects, such as any single aspect or any combination of aspects described below and/or in connection with one or more other processes described elsewhere herein.

In a first aspect, the power status report further indicates at least one of: a remaining level of battery power of the node, whether a battery of the node is being charged, a degree to which the battery of the node is being charged, an estimated remaining operating time of the node, or a combination thereof.

In a second aspect, alone or in combination with the first aspect, the power status report indicates at least one of the remaining level of battery power, whether the battery of the node is being charged, the degree to which the battery of the node is being charged, or the estimated remaining operating time of the node based at least in part on identifying that the node is supplied with power from the battery power supply.

In a third aspect, alone or in combination with one or more of the first and second aspects, process 600 includes determining an estimated remaining operating time of the node based at least in part on at least one of a remaining level of battery power of the node, a cell load of the node, an estimated future cell load of the node, an environmental factor associated with the node, or a combination thereof; and transmitting, in the power status report, the estimated remaining operating time to the other node in the wireless multi-hop network.

In a fourth aspect, alone or in combination with one or more of the first through third aspects, the other node is a parent node of the node or a central unit of a donor node of the wireless multi-hop network.

In a fifth aspect, alone or in combination with one or more of the first through fourth aspects, the power status report is transmitted periodically.

In a sixth aspect, alone or in combination with one or more of the first through fifth aspects, the power status report is transmitted based at least in part on a triggering event.

In a seventh aspect, alone or in combination with one or more of the first through sixth aspects, the triggering event includes at least one of: a determination that the node has joined the wireless multi-hop network; a determination that the power supply category has changed; or a determination that a charge state of a battery of the node has changed. In some aspects, the charge state indicates whether the battery of the node is being charged; a determination that at least one of a remaining level of battery power of the node, a degree to which the battery of the node is being charged, or an estimated remaining operating time of the node satisfies a condition; a request for the power status report received from the other node; or a combination thereof.

In an eighth aspect, alone or in combination with one or more of the first through seventh aspects, process 600 includes receiving an instruction from the other node based at least in part on transmitting the power status report; and configuring the node based at least in part on the instruction.

In a ninth aspect, alone or in combination with one or more of the first through eighth aspects, the instruction indicates at least one of: a transmit power to be used by the node, a resource configuration to be used by the node for at least one of transmit occasions or receive occasions, a duty cycle to be used by the node, a beam sweeping configuration to be used by the node, a handover of user equipment or child nodes of the node to a different node, a reconfiguration of a route through the wireless multi-hop network, a request for the node to shut down, or a combination thereof.

In a tenth aspect, alone or in combination with one or more of the first through ninth aspects, process 600 includes shutting down, or transmitting an indication that the node is shutting down, based at least in part on a determination that a parameter indicated in the power status report satisfies a condition.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a first node in a wireless multi-hop network (e.g., an IAB network), in accordance with various aspects of the present disclosure. Example process 700 is an example where a first node (e.g., IAB node 410, IAB donor 405, and/or the like) performs operations associated with power supply category and power status reporting in a wireless multi-hop network.

As shown in FIG. 7, in some aspects, process 700 may include receiving, from a second node in a wireless multi-hop network, a power status report that indicates a power supply category of the second node, wherein the power supply category indicates whether the second node is supplied with power from an alternating current power supply or a battery power supply (block 710). For example, the first node (e.g., receive processor 238, receive processor 258, controller/processor 240, controller/processor 280, memory 242, memory 282, and/or the like) may receive, from a second node in the wireless multi-hop network, a power status report that indicates a power supply category of the second node, as described above. In some aspects, the power supply category indicates whether the second node is supplied with power from an alternating current power supply or a battery power supply.

As further shown in FIG. 7, in some aspects, process 700 may include transmitting an instruction to one or more nodes in the wireless multi-hop network based at least in part on the power status report (block 720). For example, the first node (e.g., using transmit processor 220, transmit processor 264, controller/processor 240, controller/processor 280, memory 242, memory 282, and/or the like) may transmit an instruction to one or more nodes in the wireless multi-hop network based at least in part on the power status report, as described above.

Process 700 may include additional aspects, such as any single aspect or any combination of aspects described below and/or in connection with one or more other processes described elsewhere herein.

In a first aspect, the power status report further indicates at least one of: a remaining level of battery power of the second node, whether a battery of the second node is being charged, a degree to which the battery of the second node is being charged, an estimated remaining operating time of the second node, or a combination thereof.

In a second aspect, alone or in combination with the first aspect, the instruction is based at least in part on at least one of the remaining level of battery power, whether the battery of the second node is being charged, the degree to which the battery of the second node is being charged, the estimated remaining operating time of the second node, or a combination thereof.

In a third aspect, alone or in combination with one or more of the first and second aspects, the first node is a parent node of the second node or a central unit of a donor node of the wireless multi-hop network.

In a fourth aspect, alone or in combination with one or more of the first through third aspects, the power status report is received periodically.

In a fifth aspect, alone or in combination with one or more of the first through fourth aspects, the power status report is received based at least in part on a request for the power status report transmitted by the first node to the second node.

In a sixth aspect, alone or in combination with one or more of the first through fifth aspects, the instruction indicates at least one of: a transmit power to be used by the second node, a resource configuration to be used by the second node for at least one of transmit occasions or receive occasions, a duty cycle to be used by the second node, a beam sweeping configuration to be used by the second node, a handover of user equipment or child nodes of the second node to a different node, a reconfiguration of a route through the wireless multi-hop network, a request for the second node to shut down, or a combination thereof.

In a seventh aspect, alone or in combination with one or more of the first through sixth aspects, process 700 includes relaying the power status report to another node in the wireless multi-hop network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a node in a wireless multi-hop network, comprising:
   identifying, by the node, a power supply category of the node based at least in part on a manner in which the node is supplied with power, wherein the power supply category indicates whether the node is supplied with power from an alternating current power supply or a battery power supply; and
   transmitting, by the node and to another node in the wireless multi-hop network, a power status report including information that indicates the power supply category of the node and an estimated remaining operating time of the node,
      wherein the estimated remaining operating time of the node is based at least in part on at least one of a remaining level of battery power of the node, a cell load of the node, an estimated future cell load of the node, or an environmental factor associated with the node.

2. The method of claim 1, wherein the power status report further indicates at least one of:
   a remaining level of battery power of the node,
   whether a battery of the node is being charged,
   a degree to which the battery of the node is being charged,
   an estimated remaining operating time of the node, or
   a combination thereof.

3. The method of claim 2, wherein the power status report indicates at least one of the remaining level of battery power, whether the battery of the node is being charged, the degree to which the battery of the node is being charged, or the estimated remaining operating time of the node based at least in part on identifying that the node is supplied with power from the battery power supply.

4. The method of claim 1, further comprising:
   determining the estimated remaining operating time of the node based at least in part on at least one of the cell load of the node, the estimated future cell load of the node, or the environmental factor associated with the node.

5. The method of claim 1, wherein the other node is a parent node of the node or a central unit of a donor node of the wireless multi-hop network.

6. The method of claim 1, wherein the power status report is transmitted periodically.

7. The method of claim 1, wherein the power status report is transmitted based at least in part on a triggering event.

8. The method of claim 7, wherein the triggering event includes at least one of:
   a determination that the node has joined the wireless multi-hop network;
   a determination that the power supply category has changed;
   a determination that a charge state of a battery of the node has changed, wherein the charge state indicates whether the battery of the node is being charged;
   a determination that at least one of a remaining level of battery power of the node, a degree to which the battery of the node is being charged, or an estimated remaining operating time of the node satisfies a condition;
   a request for the power status report received from the other node; or
   a combination thereof.

9. The method of claim 1, further comprising:
   receiving an instruction from the other node based at least in part on transmitting the power status report; and
   configuring the node based at least in part on the instruction.

10. The method of claim 9, wherein the instruction indicates at least one of:
    a transmit power to be used by the node,
    a resource configuration to be used by the node for at least one of transmit occasions or receive occasions,
    a duty cycle to be used by the node,
    a beam sweeping configuration to be used by the node,
    a handover of user equipment or child nodes of the node to a different node,
    a reconfiguration of a route through the wireless multi-hop network,
    a request for the node to shut down, or
    a combination thereof.

11. The method of claim 1, further comprising at least one of shutting down or transmitting an indication that the node is shutting down based at least in part on a determination that a parameter indicated in the power status report satisfies a condition.

12. A method of wireless communication performed by a first node in a wireless multi-hop network, comprising:
    receiving, by the first node and from a second node in the wireless multi-hop network, a power status report including information that indicates a power supply category of the second node and an estimated remaining operating time of the second node, wherein the power supply category indicates whether the second node is supplied with power from an alternating current power supply or a battery power supply, wherein the estimated remaining operating time of the node is based at least in part on at least one of a remaining level of battery power of the node, a cell load of the node, an estimated future cell load of the node, or an environmental factor associated with the node, and wherein each of the first node and the second node is an integrated access and backhaul node; and
    transmitting, by the first node, an instruction to one or more nodes in the wireless multi-hop network based at least in part on the power status report.

13. The method of claim 12, wherein the power status report further indicates at least one of:
    a remaining level of battery power of the second node,
    whether a battery of the second node is being charged,
    a degree to which the battery of the second node is being charged,
    an estimated remaining operating time of the second node, or
    a combination thereof.

14. The method of claim 13, wherein the instruction is based at least in part on at least one of the remaining level of battery power, whether the battery of the second node is being charged, the degree to which the battery of the second node is being charged, the estimated remaining operating time of the second node, or a combination thereof.

15. The method of claim 12, wherein the first node is a parent node of the second node or a central unit of a donor node of the wireless multi-hop network.

16. The method of claim 12, wherein the power status report is received periodically.

17. The method of claim 12, wherein the power status report is received based at least in part on a request for the power status report transmitted by the first node to the second node.

18. The method of claim 12, wherein the instruction indicates at least one of:
   a transmit power to be used by the second node,
   a resource configuration to be used by the second node for at least one of transmit occasions or receive occasions,
   a duty cycle to be used by the second node,
   a beam sweeping configuration to be used by the second node,
   a handover of user equipment or child nodes of the second node to a different node,
   a reconfiguration of a route through the wireless multi-hop network,
   a request for the second node to shut down, or
   a combination thereof.

19. The method of claim 12, further comprising relaying the power status report to another node in the wireless multi-hop network.

20. A node for wireless communication in a wireless multi-hop network, comprising:
   a memory; and
   one or more processors coupled to the memory, the one or more processors configured to:
      identify, by the one or more processors, a power supply category of the node based at least in part on a manner in which the node is supplied with power, wherein the power supply category indicates whether the node is supplied with power from an alternating current power supply or a battery power supply; and
      transmit, by the one or more processors and to another node in the wireless multi-hop network, a power status report including information that indicates the power supply category of the node and an estimated remaining operating time of the node,
         wherein the estimated remaining operating time of the node is based at least in part on at least one of a remaining level of battery power of the node, a cell load of the node, an estimated future cell load of the node, or an environmental factor associated with the node.

21. The node of claim 20, wherein the power status report further indicates at least one of:
   a remaining level of battery power of the node,
   whether a battery of the node is being charged,
   a degree to which the battery of the node is being charged,
   an estimated remaining operating time of the node, or
   a combination thereof.

22. The node of claim 20, wherein the one or more processors are further configured to:
   determine the estimated remaining operating time of the node based at least in part on at least one of the cell load of the node, the estimated future cell load of the node, or the environmental factor associated with the node.

23. The node of claim 20, wherein the power status report is transmitted based at least in part on a triggering event.

24. The node of claim 23, wherein the triggering event includes at least one of:
   a determination that the node has joined the wireless multi-hop network;
   a determination that the power supply category has changed;
   a determination that a charge state of a battery of the node has changed, wherein the charge state indicates whether the battery of the node is being charged;
   a determination that at least one of a remaining level of battery power of the node, a degree to which the battery of the node is being charged, or an estimated remaining operating time of the node satisfies a condition;
   a request for the power status report received from the other node; or
   a combination thereof.

25. The node of claim 20, wherein the one or more processors are further configured to:
   receive an instruction from the other node based at least in part on transmitting the power status report; and
   configure the node based at least in part on the instruction.

26. The node of claim 25, wherein the instruction indicates at least one of:
   a transmit power to be used by the node,
   a resource configuration to be used by the node for at least one of transmit occasions or receive occasions,
   a duty cycle to be used by the node,
   a beam sweeping configuration to be used by the node,
   a handover of user equipment or child nodes of the node to a different node,
   a reconfiguration of a route through the wireless multi-hop network,
   a request for the node to shut down, or
   a combination thereof.

27. A first node for wireless communication in a wireless multi-hop network, comprising:
   a memory; and
   one or more processors coupled to the memory, the one or more processors configured to:
      receive, by the one or more processors and from a second node in the wireless multi-hop network, a power status report including information that indicates a power supply category of the second node and an estimated remaining operating time of the second node, wherein the power supply category indicates whether the second node is supplied with power from an alternating current power supply or a battery power supply, wherein the estimated remaining operating time of the node is based at least in part on at least one of a remaining level of battery power of the node, a cell load of the node, an estimated future cell load of the node, or an environmental factor associated with the node, and wherein each of the first node and the second node is an integrated access and backhaul node; and
      transmit, by the one or more processors, an instruction to one or more nodes in the wireless multi-hop network based at least in part on the power status report.

28. The first node of claim 27, wherein the power status report further indicates at least one of:
   a remaining level of battery power of the second node,
   whether a battery of the second node is being charged, a degree to which the battery of the second node is being charged, an estimated remaining operating time of the second node, or a combination thereof.

29. The first node of claim 27, wherein the instruction indicates at least one of:

a transmit power to be used by the second node, a resource configuration to be used by the second node for at least one of transmit occasions or receive occasions, a duty cycle to be used by the second node, a beam sweeping configuration to be used by the second node, a handover of user equipment or child nodes of the second node to a different node, a reconfiguration of a route through the wireless multi-hop network, a request for the second node to shut down, or a combination thereof.

30. The first node of claim 27, further comprising relaying the power status report to another node in the wireless multi-hop network.

\* \* \* \* \*